June 24, 1958
F. McMILLEN
2,839,773
HEATED WINDOW WIPER
Filed Aug. 31, 1955
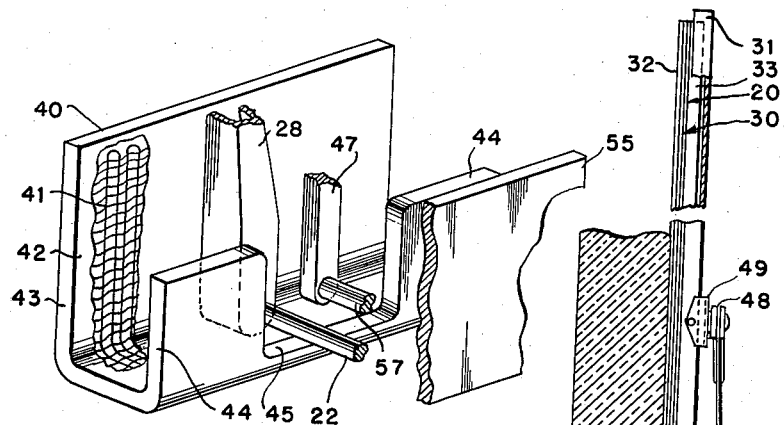
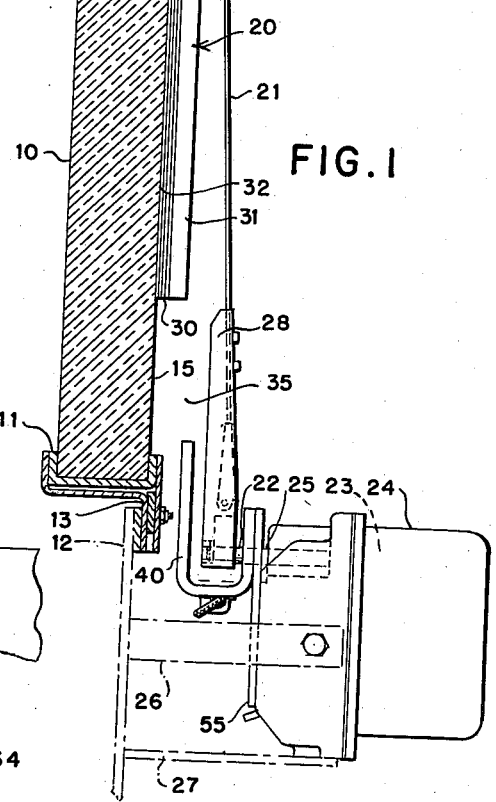
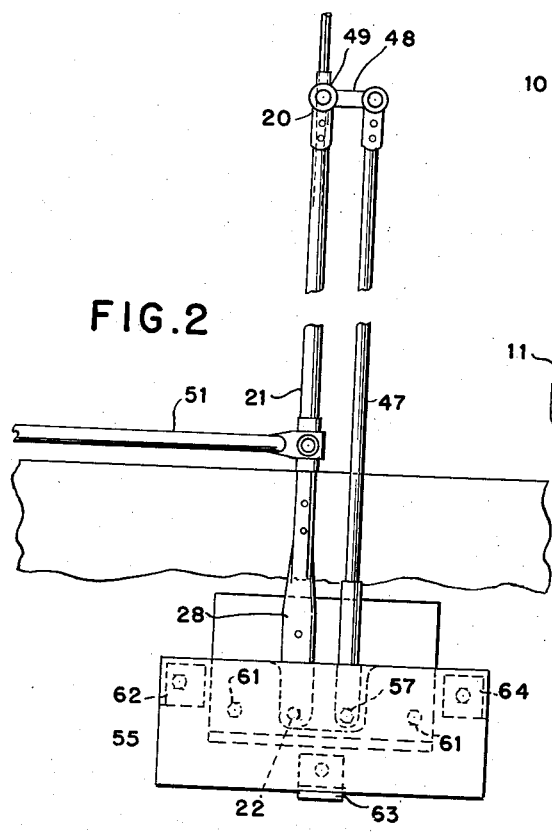
INVENTOR.
Foster McMillen
ATTORNEY

United States Patent Office

2,839,773
Patented June 24, 1958

2,839,773

HEATED WINDOW WIPER

Foster McMillen, Staten Island, N. Y., assignor to Kearfott Company, Inc., Little Falls, N. J., a corporation of New York Application August 31, 1955, Serial No. 531,782

6 Claims. (Cl. 15—250.5)

This invention relates to window wiper assemblies, and particularly to a motor-operated window wiper, for use in an application where the window and the wiper will be exposed to severe ambient weather and low-temperature conditions.

In such application moisture and snow may be blown against the window and the wiper at gale velocities and at freezing temperatures, and could accumulate quickly to form ice on the window and on the wiper to such an extent as to interfere with the normal operation of the wiper.

A primary object of this invention is to provide a swivelled or oscillating wiper assembly, including a heater for the wiper, the heater being located and shaped to enfold the region enclosing the actuated or swivelled end of the wiper arm, to establish a heated zone at such actuated end of the wiper arm, to prevent the formation and accumulation of snow or ice, on the swivelled end of the wiper arm, that might interfere with the normal operation of the wiper arm.

Another object of the invention is to provide a wiper arm assembly including a protective heater, with the heater shaped and adapted for mounting in such manner as to be easily placed in operating position, adjacent the actuated or swivelled end of the arm, or to be removed from operating position to permit access to the arm, for replacement or repair of the heater or of the arm.

Another object of this invention is to provide a heater formed and shaped to permit simple and ready application to a wiper assembly and to permit easy removal from the wiper assembly, to permit access to the wiper arm or to the heater itself, for replacement or repair.

One specific use to which the present invention is particularly applied to is to keep clear a selected area of an observation window of a pilot house or navigation bridge of a sea-going vessel. The weather conditions that may be encountered will vary over a wide range, including rain and snow at temperatures near or below the freezing point.

Ordinarily, a window wiper blade is relied upon for wiping vapor and moisture from the front or exposed surface of the window panel. The blade is operated by one end of an arm. The other end of the arm is connected to and actuated by an oscillatable or swivelled shaft which is oscillated about the shaft axis to move the arm and the wiper blade. Where the arm extends upward from such axis, such moisture or snow wiped by the blade may slide down the wiper arm onto the oscillatable shaft and then freeze, to form and accumulate ice to an extent that would interfere with the normal operation of the wiper arm.

Similarly, moisture and snow could accumulate and form an enlarging ice mass in the region between the wiper arm and the window, or the window frame, that would interfere with the operation of the arm.

By the present invention, however, the general region at the lower end of the wiper arm between the arm and the window, and between the arm and the supporting structure for the swivelling device for the arm, is heated to melt the snow and thus prevent ice from forming in the region where it would interfere with the operation of the arm.

The construction and the manner of operation of a protected window wiper, and of a heater therefore, in accordance with the present invention, are illustrated in the accompanying drawings, in which:

Figure 1 is a side view, partially in elevation, and partially in section, showing part of a window panel and a wiper assembly mounted adjacent thereto, with a heater disposed adjacent the wiping arm and window frame, to prevent the accumulation and packing of snow or ice at the swivelled end of the wiper arm;

Figure 2 is a front elevational view of a similar wiper assembly for a double wiper blade, showing a protective heating element enfolding the region around the swivel axis and the space between arm and window, near the axis; and Figure 3 is a perspective view of the heater, showing its form and disposition to enfold the lower end of the wiper arm.

As shown in Figure 1, a plate glass window panel 10 is supported in a frame 11 on a structural framework, indicated schematically by a wall 12, with suitable fastening and supporting elements such as a bracket and bolt assembly 13. The wall 12 represents part of the supporting structure of a ship or vessel upon which the window is carried as part of an observation or lookout station. The outer surface 15 of the window panel is exposed to outside weather conditions, and, in the course of its service, may be subjected to low temperatures at or below freezing, under conditions of rain or snow.

Normally, the outer surface 15 of the window panel 10 is arranged to be kept clear of moisture, or rain, or snow, by a wiper 20 which is supported on and operated by the upper end of a wiper arm 21. The lower end of the wiper arm 21 is arranged to be actuated by a shaft 22, which in turn, is arranged to be oscillated through a limited angle by an electric motor 23 and an eccentric device enclosed in a housing 24. The shaft 22 is supported in a bearing 25 in the motor housing 24, and the motor housing is supported on the main structure 12 by suitable brackets 26 and 27.

The lower end of the wiper arm 21 is supported on and within a hollow channel-shaped bracket 28 having a generally U-shaped cross-section. The channel bracket 28 serves also as a support for a spring element (not shown) to bias the wiper arm towards the window. At the same time, the bracket 28 serves as a simple adapter onto which the arm may be easily fitted for assembly, and from which the arm may be easily removed for purposes for replacement or repair of the wiper or arm.

The wiper 20 consists generally of an elongated rubber wiper blade 30 and a supporting rigid shroud 31. The rubber blade 30 usually has a front wiping edge 32 that engages the glass surface and a backwardly extending rib 33 by means of which the metallic shroud 31 holds the wiper blade tightly to manipulate the front edge 32. The wiper blade 30 and its shroud 31 constitute a relatively thin element, with the back edge of the shroud extending only a short distance from the front surface 15 of the window panel 10.

The function of the wiper is such that the operating arm 21 is placed as close as possible to the back edge of the wiper blade shroud 31, in order to impart maximum operating force to the blade. Consequently, the space 35, near the bottom of the window panel 10 and the hollow bracket 28 constitutes a relatively small pocket space, within which damp sticky snow could readily accumulate and pack, and quickly convert to ice, when the ambient temperature is at or below the freezing point.

In the same manner, moisture or rain or snow dripping down the wiper arm could convert to snow or ice and accumulate at the lower end of the wiper arm, between wiper arm and bearing or motor housing.

An accumulation of ice at the lower end of the operating arm would, of course, cover the lower end of the operating arm and could possibly extend over to the adjacent structure of the motor housing 24, with consequent interference with the normal operation of the wiper arm.

Thus, snow or ice could pack and form between the arm bracket 28 and the supporting structure for the window, along the lower rim of the window panel 10, and, similarly, snow and ice could form and pack between the arm and the motor housing 24.

In order to prevent such snow packing and ice formation adjacent the lower end of the wiper arm 21, a heater 40 is disposed to heat the region adjacent the lower end of the wiper arm. As shown in the drawings, the heater 40 consists of a heating element 41 embedded in a heat-resistant thermo-setting plastic material 42, which may be readily molded in any desirable shape to encase the heating element 41. The heating element consists of a metallic conductor of a suitable metallic alloy with proper insulating covering, such as woven glass fabric; and is preferably formed as a woven fabric-type structure so it will be sufficiently flexible to assume a desired formation.

The heater 40, in this instance, is shown as having a substantially J-shaped section, with a high wall 43 and a short wall 44. The short wall 44 is provided with a deep notch or opening 45 to accommodate the operating shaft from the motor 23 to the lower end of the channel bracket 28, which supports the lower end of the operating arm. Such notch permits the heater 40 to be positioned to straddle the operating shaft.

For the purpose of further illustration, a wiper of a parallel operating type is shown in Fig. 2. The blade is controlled to be held in parallel positions throughout its movement. In order to maintain the necessary parallelogram for controlling such motion, as auxiliary arm 47 and a connecting link 48 are provided, with link 48 disposed between the auxiliary arm 47 and a connector 49 on the blade yoke 20. Also shown is a connection to an additional blade, to be controlled by the same motor. For that purpose, a connecting arm 51 is shown extending from the main wiping arm 21 to the remotely spaced arm of the second wiper, that is not shown.

As shown in Figures 2 and 3, the channel shaped bracket 28 is secured to motor shaft 22, and the auxiliary arm 47 is pivoted at its lower end on a pin 57 that is suitably supported and anchored on the motor housing. The notch 45 in the short wall 44 of the heater is wide enough to straddle both the shaft 22 and the pin 57.

The heater 40, as a unit, is mounted on its supporting bracket 55 by suitable bolts 61, and the bracket 55 is secured to the motor housing by suitable bolts and clips indicated at 62, 63 and 64.

The heater 40 is individually mounted on a supporting and mounting bracket 55, and the bracket 55 is, in turn, individually mounted on the motor housing 24. By means of such arrangement, the heater 40 may be assembled on the motor before or after the motor is mounted on its supporting brackets 25 and 26. Moreover, in case it becomes necessary to replace or to repair the wiper, or to adjust its position on the motor shaft, the heater and its supporting bracket 55 may be easily removed as a unit to provide such access to the bracket at the motor shaft. Such simple mounting also permits easy replacement of the heater.

The disposition of the heater 40, as shown in Figure 2, enables the heater 40 to maintain a heated zone around the lower end of the wiper arm and around the shaft 22 where it extends or protrudes from the motor housing 24. At the same time, the high wall 43 of the heater 40 heats the region 35 between the heater and the window frame, and including the metallic bracket elements 11 and 13 along the lower edge of the window panel 10. Such heated regions prevent formation or accumulation of snow or ice, which would serve as a base upon which more snow and ice could accumulate and pack, to grow over into the path of the movement of the bracket 28 for the arm, or into the path of the lower edge of the wiper blade 20.

Thus by application of a simple concentrated heater adjacent the regions around the axis at the lower end of the oscillating wiper arm, those regions are kept warm enough to prevent the accumulation of snow or ice that would interfere with the operation of the wiper arm or blade.

It is not necessary to melt all the snow or ice that may come into the spaces to be controlled by the heater. The formation of a softened surface on the snow or ice provides a wet film that acts as a lubricant to aid the snow or ice to lose its adherence to the several metallic surfaces and to drop from them.

The invention has been illustrated in simple form to show one modification thereof. Changes may be made in the arrangement, in the construction, or in the relative disposition of the heater in respect to its cooperating elements, however, without departing from the spirit and scope of the invention as herein described.

What is claimed is:

1. A windshield cleaner for a transparent viewing window that is to serve as a windshield, and having its outer surface exposed to ambient weather conditions, said cleaner comprising a wiper to wipe a pre-determined area of the exposed outer surface; an actuating arm for the wiper; a motor; an oscillating device operable by the motor to oscillate the actuating arm, said oscillating device having a stub shaft for connection to one end of the actuating arm; a casing enclosing the motor and the oscillating device and having an opening to permit the stub shaft to protrude out of the casing, the wall encircling said opening serving to accommodate and support a bearing to journal the protruding stub shaft; and heating means providing a temperature field around the stub shaft to prevent the accumulation of snow or the formation of ice between the stub shaft and the bearing that might interfere with the normal free oscillation of the stub shaft, said heating means consisting of a J-shape section with a notch in the short wall of the J-section to provide an open space to accommodate the stub shaft, and with the long wall to serve as an outer wall and as a partial cover for the stub shaft and the lower end of the operating arm, to define the upper end of the temperature field around the stub shaft.

2. The windshield cleaner set out in claim 1, in which a bracket is removably secured to and supported on the housing enclosing the motor and oscillator; and the heating means is secured to the bracket to permit the bracket to be applied, or to be removed, as a unit, to or from said housing.

3. The windshield cleaner as in claim 1, in which said heating means consists of a heating element encased in a weather-resistant and high-temperature-resistant insulating material.

4. A heater, for use with an oscillatable window wiper having a wiper arm with one end of the arm connected to an actuating shaft, with the shaft disposed to swivel about an axis to oscillate the arm, the heater comprising: a heating element disposed adjacent the swivel axis; a thermosetting plastic covering encasing said heating element, and being of substantially J-shape to fit around the swivelled end of the wiper arm, with the short wall of the J-section being notched to accommodate and straddle the space region surrounding the swivelled end of the arm and its connection to the actuating shaft; and terminal conductors connected to the heating element and anchored in the plastic casing and extending out beyond the casing for connection to an external circuit.

5. A heater as in claim 4, comprising, additionally, a bracket for supporting the heater as a unit, the bracket being bifurcated to slip over and straddle the space region surrounding the swivelled end of the arm and the actuator shaft, to permit simple and ready application, or removal, of the bracket and the heater as a unit.

6. A heater, for use with an oscillatable window wiper having a wiper arm with one end of the arm connected to an actuating shaft, with the shaft disposed to swivel about an axis to oscillate the arm, the heater comprising a J-shaped heating element encased in a thermosetting plastic, with the short wall of the J provided with a notch to permit the heater to be straddle-fitted over such actuating shaft and to enfold the swivel end of the wiper arm.

References Cited in the file of this patent
UNITED STATES PATENTS

| | | |
|---|---|---|
| 2,271,225 | Heffernan | Jan. 27, 1942 |
| 2,677,143 | Blaney | May 4, 1954 |